United States Patent [19]

Aldrich et al.

[11] 4,090,975
[45] May 23, 1978

[54] MIXTURES OF NEMATIC LIQUID CRYSTAL MATERIALS

[75] Inventors: Ralph E. Aldrich, Acton; William J. Cumming, N. Chelmsford, both of Mass.; William A. Simmons, Jr., Houston, Tex.

[73] Assignee: Itek Corporation, Lexington, Mass.

[21] Appl. No.: 700,354

[22] Filed: Jun. 28, 1976

Related U.S. Application Data

[63] Continuation-in-part of Ser. No. 519,970, Nov. 1, 1974, abandoned, and Ser. No. 519,971, Nov. 1, 1974, abandoned.

[51] Int. Cl.$^2$ .......................... C09K 3/34; G02F 1/13
[52] U.S. Cl. .................................... 252/299; 252/408; 350/350
[58] Field of Search ............................. 252/299, 408; 350/160 LC

[56] References Cited

U.S. PATENT DOCUMENTS

| | | | |
|---|---|---|---|
| 3,655,270 | 4/1972 | Creagh | 252/299 |
| 3,716,289 | 2/1973 | Creagh et al. | 252/299 |
| 3,772,209 | 11/1973 | Batesky | 252/408 |
| 3,815,972 | 6/1974 | Hsieh | 252/299 |
| 3,881,806 | 5/1975 | Suzuki | 252/299 |
| 3,915,883 | 10/1975 | Van Meter et al. | 252/299 |
| 3,923,857 | 12/1975 | Boller et al. | 252/299 |
| 3,927,064 | 12/1975 | Boller et al. | 252/299 |
| 3,953,491 | 4/1976 | Steinstrasser et al. | 252/299 |
| 3,960,752 | 6/1976 | Klanderman et al. | 252/299 |
| 3,975,286 | 8/1976 | Oh | 252/299 |
| 3,988,054 | 10/1976 | Yaguchi et al. | 252/299 |

FOREIGN PATENT DOCUMENTS

| | | | |
|---|---|---|---|
| 2,502,904 | 7/1975 | Germany | 252/299 |
| 2,511,884 | 10/1975 | Germany | 252/299 |
| 2,535,125 | 2/1976 | Germany | 252/299 |
| 4,731,883 | 11/1972 | Japan | 252/299 |
| 48,102,784 | 12/1973 | Japan | 252/299 |

OTHER PUBLICATIONS

Elliott, G., et al., Electronics Letters, vol. 9, No. 17, pp. 399-401 (8/1973).

*Primary Examiner*—Benjamin R. Padgett
*Assistant Examiner*—T. S. Gron
*Attorney, Agent, or Firm*—Homer O. Blair; Robert L. Nathans; David E. Brook

[57] ABSTRACT

Liquid crystal mixtures are disclosed which contain 30-60% of a Schiff's base nematic liquid crystal compound, 25-65% of a second nematic liquid crystal compound selected from the classes of azoxy, ester and biphenyl, and 5-15% of a triphenyl compound to raise the isotropic transition temperature. This combination results in liquid crystal compositions having unexpectedly wide nematic temperature ranges.

1 Claim, 7 Drawing Figures

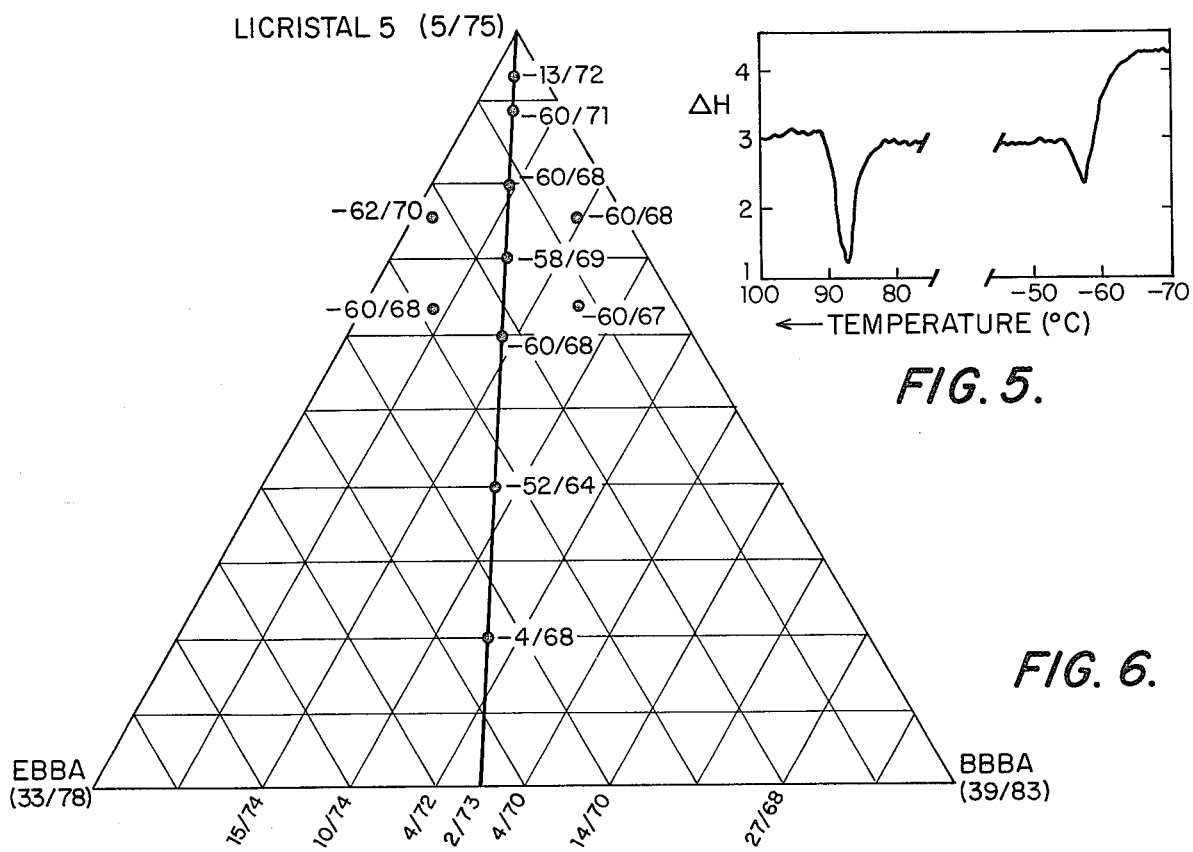
*FIG. 5.*
*FIG. 6.*
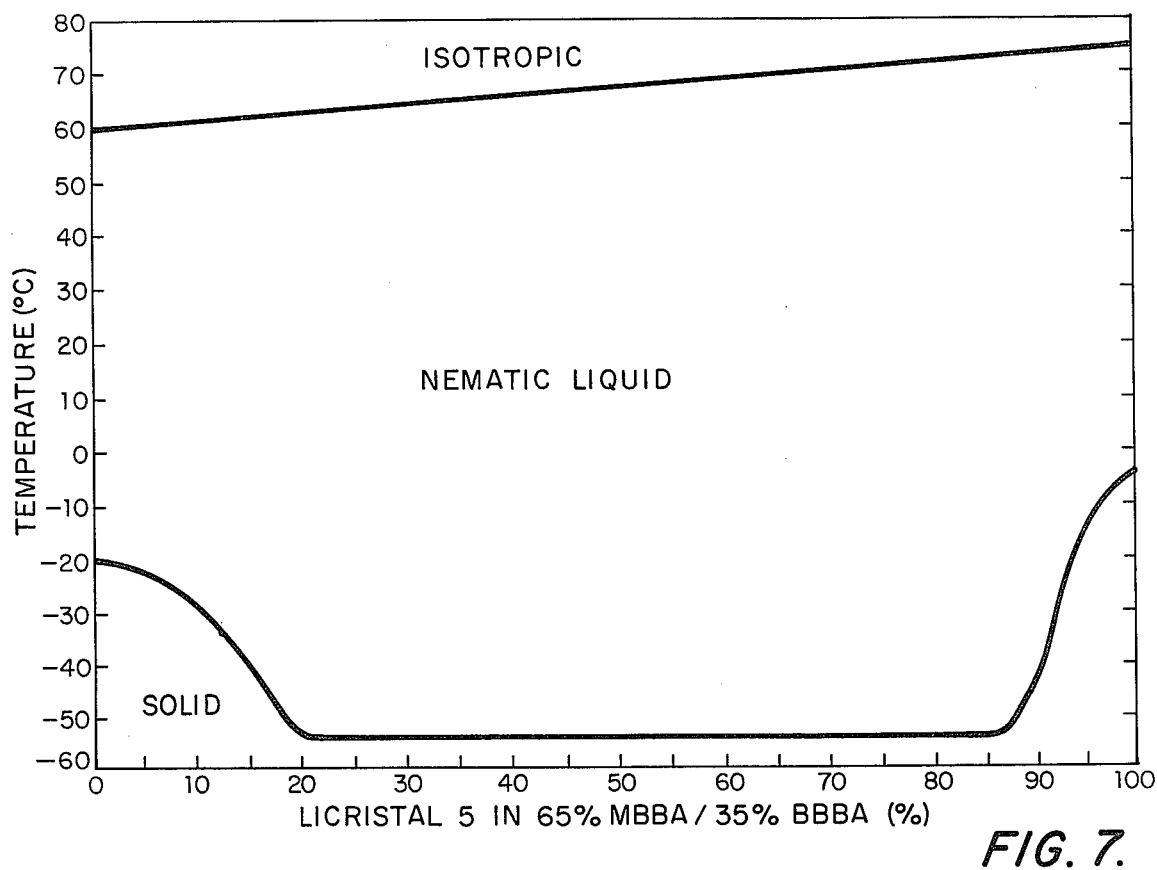
*FIG. 7.*

MIXTURES OF NEMATIC LIQUID CRYSTAL MATERIALS

RELATED APPLICATIONS

This is a continuation-in-part of Ser. Nos. 519,970 and 519,971, both filed on Nov. 1, 1974, both now abandoned.

BACKGROUND OF THE INVENTION

1. Field of the Invention

This invention relates to liquid crystal materials and more specifically to mixtures of nematic liquid crystal materials from different chemical classes.

2. Description of the Prior Art

Recently there has been widespread interest in the class of materials known as liquid crystals. Generally, liquid crystals exhibit some physical properties typically associated with liquids but also exhibit other physical properties typically associated with crystalline solids. For example, their viscosities are ordinarily similar to those of liquids whereas their optical properties are similar to those of crystalline solids.

Liquid crystals are known to appear in at least three different mesomorphic forms: the smectic, cholesteric and nematic forms. Nematic liquid crystal materials assume the characteristics of a thread-like texture when a thin section of the material is viewed between crossed polarizers. One type of nematic liquid crystal is normally transparent to light in the absence of an electric field but scatters light in the presence of an electric potential applied thereacross. This effect has been termed "dynamic scattering" and has become very useful in many electrooptic display devices. Another type of nematic liquid crystal has the property of altering the polarization of light under an applied electric field; this type is known as "field effect" materials and has a positive dielectric anisotropy as opposed to the negative dielectric anisotropy of dynamic scattering materials.

Nematic liquid crystal materials have traditionally exhibited high mesomorphic transition temperatures which sometimes made it necessary to add external heating apparatus to displays to maintain materials in their mesomorphic range. Another serious problem with nematic materials has been the very narrow mesomorphic temperature range which they exhibit. Previous attempts have been made to broaden the mesomorphic temperature range of nematic liquid crystal materials, but heretofore, none have been completely satisfactory. Attempts to lower the freezing point of such materials by mixing closely related compounds have not been very successful because each successive compound added tends to have less effect on the freezing point than the previously added compounds. In addition, there is often a concomitant lowering of the isotropic transition temperature which severely limits high temperature operation and tends to offset any gain achieved by lowering the freezing point.

U.S. Pat. No. 3,716,289 discloses an attempt to broaden the temperature range of nematic liquid crystal materials by combining such materials with smectic liquid crystal materials, and in some cases with smectic and cholesteric materials. While such mixures have improved the mesomorphic temperature range somewhat, they have not resulted in greatly widened ranges.

U.S. Pat. No. 3,779,751 teaches the mixing of cholesteric liquid crystal materials with particular combinations of Schiff's bases and also teaches that various Schiff's base liquid crystal materials can be mixed to achieve wider mesomorphic temperature ranges. In spite of this, these compositions have a limited reduction of their freezing point and have a tendency to form smectic compositions over a large portion of their concentration range.

U.S. Pat. No. 3,781,088 discloses the mixing of nematic liquid crystal materials with cholesteric compounds. U.S. Pat. No. 3,655,270 discloses ternary nematic liquid crystal compositions containing three Schiff's bases to broaden the mesomorphic temperature range. U.S. Pat. No. 3,792,915 discloses that mixtures of certain asymmetric, optically active, p-alkoxybenzylidene-p'-aminobenzonitrile compounds with nematic liquid crystals formed from cholesteric liquid crystals which, upon application of an electric field, form a nematic liquid crystal.

A mixture claimed to have a wide nematic temperature range is disclosed in U.S. Pat. No. 3,655,270 to Creagh. This mixture contains three ingredients, which are: (1) 4-ethoxybenzylidene-4'-n-butylaniline (EBBA), a Schiff's base; (2) 4-methoxybenzilidene-4'-aminophenylbutyrate, a Schiff's base ester; and (3) bis(4'-n-octyloxybenzal)-2-chloro-1,4-phenylenediamine (OBCPD), a triphenyl compound capable of raising the isotropic transition temperature. A number of mixtures of these three ingredients is presented in Table I, col. 6 of this patent wherein the lowest freezing point obtained is $-15°$ C. For many applications, this is insufficient.

SUMMARY OF THE INVENTION

The invention comprises mixing different classes of nematic liquid crystal materials to provide a composition having a wider nematic temperature range. Generally, such mixtures are formed from 30–60% of at least one Schiff's base nematic liquid crystal compound, 25–65% of at least one other nematic liquid crystal compound selected from the classes of azoxy, ester and biphenyl, and 5–15% of a triphenyl compound capable of raising the isotropic transition point of such mixtures.

It has been found that these mixtures of materials from different classes provide outstanding liquid crystal compositions. The most significant advantage is an extremely wide nematic temperature range which is partly achieved because of a significant reduction in freezing point. In fact, the freezing point is far lower than would be predicted for a eutectic mixture of the liquid crystal materials. Mixtures formulated in accordance with this invention tend not to crystallize at their freezing point, but to solidify as amorphous materials. Characteristically, the mixtures exhibit a second order phase transition; the customary first order nematic-crystal transition appears to be suppressed.

The addition of the triphenyl compound, particularly to low temperature mixtures, provides relatively high isotropic transition points without causing a concomitant raising of the nematic-solid transition point (sometimes referred to herein as "freezing points").

BRIEF DESCRIPTION OF THE DRAWINGS

FIG. 5 illustrates the determination of a second order transition for the composition located in FIG. 3;

FIG. 6 illustrates a phase diagram for a ternary mixture of nematic liquid crystal materials according to this invention;

FIG. 7 illustrates another quasi binary mixture according to this invention.

DESCRIPTION OF THE PREFERRED EMBODIMENTS

Figure 1:
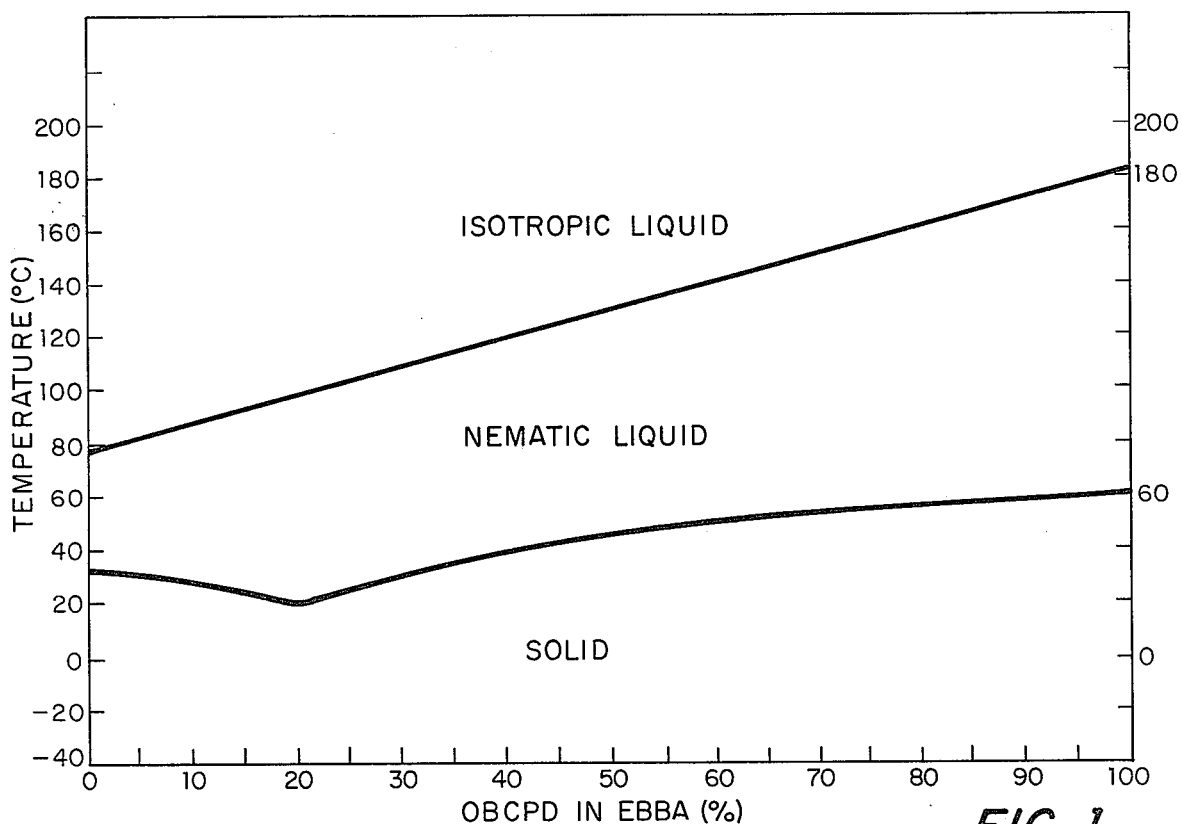
FIG. 1 illustrates a phase diagram for binary mixtures of two nematic liquid crystal materials.

The mixtures of this invention contain two or more individual nematic liquid crystal materials chosen from different classes. In some cases, significantly lowered freezing points can be obtained using only two materials, but in most cases, it is preferred to use three or more. Four or more materials can be used, if desired, but in general, it is also preferred to use the least number possible to gain the results needed.

These mixtures contain a first nematic liquid crystal compound of the Schiff's base type. Schiff's bases have the following structural formula:

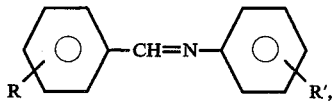

wherein R and R' are individually selected from hydrogen, $C_1$-$C_8$ alkyl, $C_1$-$C_8$ alkoxy, $C_1$-$C_8$ alkyl ester, nitrile, or halogen. In general, Schiff's bases are easy to synthesize and purify and offer wide flexibility in the temperature range available simply by choosing appropriate end groups. Typically, Schiff's bases are synthesized by condensing an aromatic aldehyde with an aromatic amine. One of the disadvantages of Schiff base materials is their chemical instability, e.g., they react easily with water, oxygen, etc. A typical nematic temperature range for this class of materials is illustrated by p-ethoxybenzylidene-p'-n-butylaniline (EBBA) which has a melting point of +38° C. and an isotropic transition temperature of +81° C. More detailed information is found in German Offenlegunsschrift No. 1951092, the teachings of which are hereby incorporated by reference.

Other illustrative Schiff's bases which are nematic liquid crystals and are suitable for this invention include, but are not limited to:

p-butoxybenzylidene-p'-n-butyl aniline
p-hexyloxybenzylidene-p'-n-butyl aniline
p-ethoxybenzylidene-p'-n-pentyl aniline
p-butoxybenzylidene-p'-n-pentyl aniline
p-hexyloxybenzylidene-p'-n-hexyl aniline
p-butoxybenzylidene-p'-n-heptyl aniline
p-hexyloxybenzylidene-p'-n-octyl aniline
p-methoxybenzylidene-p'amino phenyl butyrate
p-hexyloxybenzylidene-p'amino benzonitrile
p-heptanoic acid-[p-hydroxybenzylidene-p-amino benzonitrile] ester.

The Schiff's base compound or compounds are present in an amount of from about 30 to about 60% by weight. Preferred compositions contain from about 45 to about 55%, by weight, of the Schiff base material.

The mixtures described herein also contain at least one other nematic liquid crystal compound selected from a class different from Schiff's bases. Thus, the second can be, for example, an azoxy or an ester or a biphenyl or a nematic liquid crystal compound from an entirely different class as long as the combination of the two materials results in an unexpectedly wider temperature range than would be predicted from a eutectic mixture of the two compounds.

One class of nematic liquid crystal compounds suitable for the second liquid crystal compound in the mixture is the class of mesomorphic azoxy compounds. This class can be represented by the structural formula:

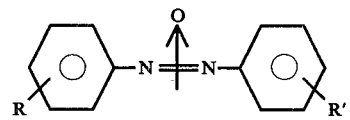

wherein R and R' are as described above. Azoxy liquid crystal materials have, in general, a wider nematic temperature range than Schiff's bases and they are more chemically stable. However, they have the disadvantage of being bright yellow in color which limits their usefulness because of the loss of the absorbed blue portion of a white light spectrum. Typically, azoxy compounds are prepared by reduction of substituted nitrobenzenes. A typical temperature range for an azoxy material is illustrated by the compound p-methoxy-p'-n-butylazoxybenzene which has a melting point of +16° C. and an isotropic transition temperature of +76° C. More detailed information is found in British Patent Specification 1,285,388, the teachings of which are hereby incorporated by reference.

Other suitable examples of azoxy liquid crystal compounds include:

p-ethyl-p'-methoxy-azoxybenzene
p-ethyl-p'-n-butyloxy-azoxybenzene
p-n-propyl-p'-n-butyloxy-azoxybenzene
p-n-butyl-p'-n-pentyloxy-azoxybenzene
p-n-pentyl-p'-methoxy-azoxy-benzene Another suitable class of liquid crystals for the second compound is the class of mesomorphic ester compounds, which can be represented by the structural formula:

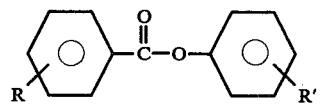

wherein R and R' are as described above. Typically, ester compounds are prepared by esterifying a substituted benzoic acid with a substituted phenol. Esters have relatively narrow nematic temperature ranges but are generally chemically stable and white in color when they are in a scattering state. A typical nematic temperature range for this class is illustrated by the compound p-butylbenzoic acid-p-heptyloxyphenyl ester which has 4-(4'-pentylphenylcarbonyloxy)-2-chloro-4"-pentyl-phenylbenzoate

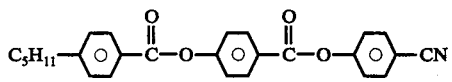

4-(4'-pentylphenylcarbonyloxy)-4"-cyanophenylbenzoate

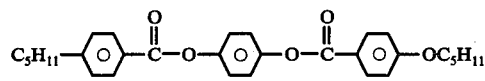

1,4-phenylene-bis(4'-pentyloxy)benzoate

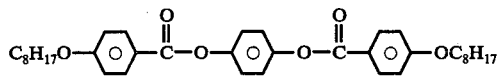

1,4-phenylene-bis(4'-octyloxy)benzoate

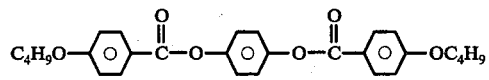

1,4-phenylene-bis(4'-butyloxy)benzoate

In general, relatively small amounts of the triphenyl compounds described herein are effective in raising the isotropic transition temperature. However, the amount added should be enough to have a significant effect on the isotropic transition temperature, e.g., above about 5%. On the other hand, amounts above about 15% are not normally used since such amounts tend to also raise the freezing point of liquid crystal compositions. Preferred amounts are between about 10 and 14%, by weight.

Particularly preferred compositions according to this invention contain a Schiff's base nematic liquid crystal compound, an azoxy and/or ester liquid crystal compound, and from about 10 to about 14%, by weight, of bis(4'-n-octyloxybenzal)-2-chloro-1,4-phenylenediamine to raise or maintain the isotropic transition temperature. Such mixtures provide liquid crystal materials with very low freezing points, such as about −50° C., but with good isotropic transitions points, such as about 80° C. As those skilled in the art will recognize, such compositions have an exceptionally wide nematic temperature range. Because of this, these compositions can be used in cockpit displays for high altitude aircraft and in other applications wherein the compositions are required to function over an extremely wide temperature range. Three rather specific illustrations of such compositions are:

| | |
|---|---|
| p-ethoxybenzylidene-p'-n-butylaniline (EBBA) | 40 to 60% |
| Licristal 5(mixture of azoxybenzenes) | 35 to 50% |
| bis(4'-n-octyloxybenzal)-2-chloro-1,4-phenylenediamine (OBCPD) | 10 to 14% |
| | 100% |
| p-butoxybenzylidene-p'-n-butylaniline (BBBA) | 40 to 60% |
| Licristal 5 | 35 to 50% |
| bis(4'-n-octyloxybenzal)-2-chloro-1,4-phenylenediamine (OBCPD) | 10 to 14% |
| | 100% |
| p-ethoxybenzylidene-p'-n-butylaniline (EBBA) | 45 to 65% |
| Licristal 9(mixture of esters) | 20 to 40% |
| bis(4'-n-octyloxybenzal)-2-chloro-1,4- | |

-continued

| | |
|---|---|
| phenylenediamine (OBCPD) | 10 to 14% |
| | 100% |

Other materials can be mixed in with the essential ingredients described herein, of course, as long as they do not materially affect the desired properties of the compositions.

The following examples further illustrate the invention.

EXAMPLE 1

This Example illustrates how a liquid crystal composition containing several different classes of nematic materials and having a broad temperature range is formed. The nematic materials used are Licristal 5 (a mixture believed to be 35% p-ethyl-p'-methoxyazoxybenzene and 65% p-n-butyl-p'-methoxyazoxy-benzene which is sold by Merck), p-ethoxybenzylidene-p'-n-butylaniline (EBBA) and bis(4'-n-octyloxybenzal)-2-chloro-1,4-phenylenediamine (OBCPD). These have individual mesomorphic temperature ranges of:

| | |
|---|---|
| Licristal 5 | −5 to 75° C |
| EBBA | 33 to 78° C |
| OBCPD | 61 to 182° C. |

Initially, the minimum melting point composition for binary mixtures of two of the three materials is determined. As a general rule, when two of the starting materials are from the same class, it is preferred to find the minimum melting point composition for these. Because EBBA and OBCPD are both Schiff's bases, these are chosen in this example.

Since liquid crystal compositions typically exhibit super-cooling, minimum freezing points are determined by slowly cooling compositions to the solid state followed by the addition of heat until the melting point is observed. This eliminates any possible effect due to super-cooling. FIG. 1 illustrates a phase diagram obtained in this manner for binary mixtures of EBBA and OBCPD. The minimum melting point (+20° C.) for this binary mixture occurs at a composition of approximately 80% EBBA and 20% OBCPD by weight.

Figure 2:
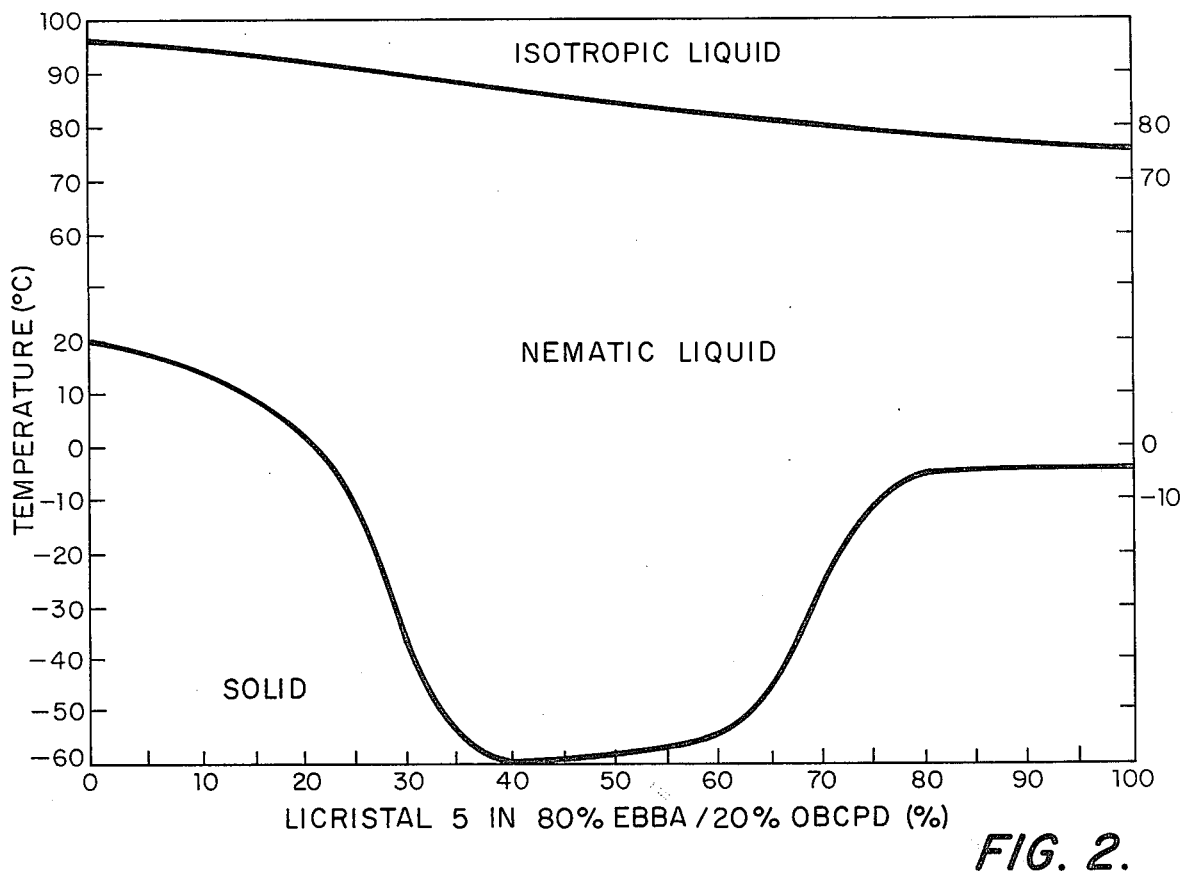
FIG. 2 illustrates a phase diagram for quasi binary mixtures formed by adding a third nematic liquid crystal material to the minimum freezing point composition determined from FIG. 1.

Next, a new minimum freezing point composition is determined for a quasi-binary mixture formed from the minimum melting point composition as determined above and the third nematic material. A phase diagram is prepared for a binary formed by adding Licristal 5 to a composition of 80% EBBA and 20% OBCPD; the result is illustrated in FIG. 2. The new minimum melting point (−60° C.), occurs at approximately 40% Licristal 5, and may be a true minimum or only a rough approximation of what the minimum melting point would be for a true ternary mixture of these compounds.

Figure 3:
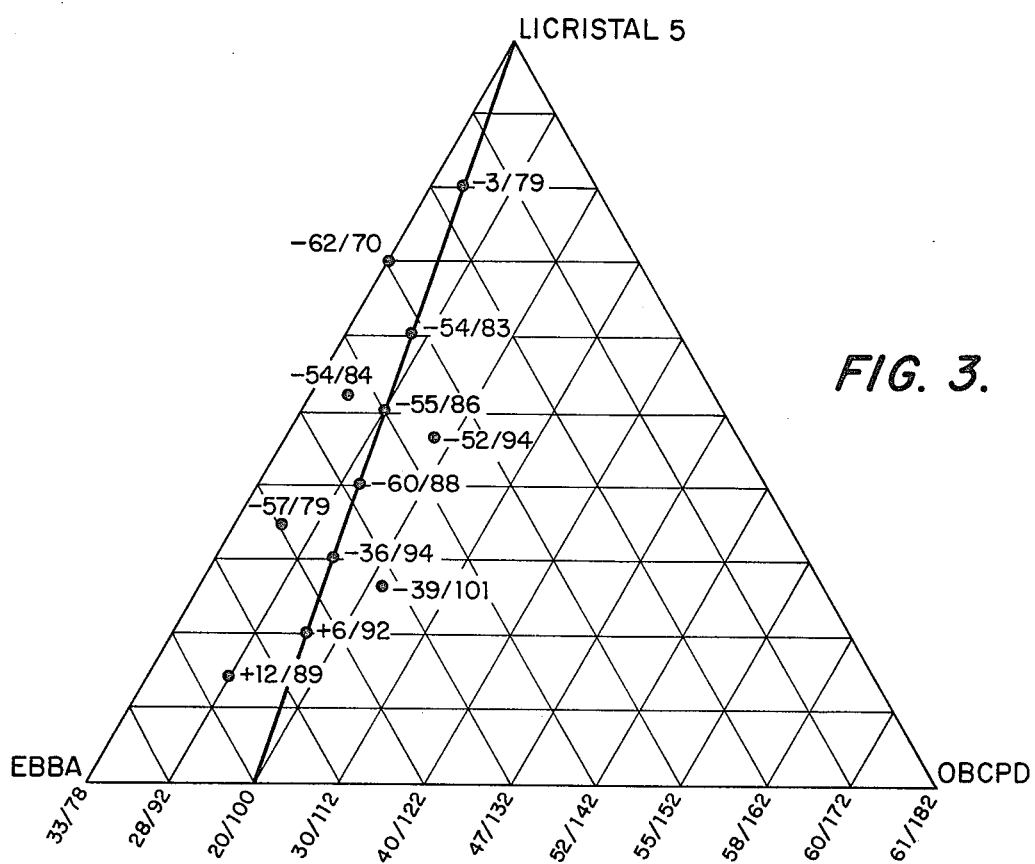
FIG. 3 illustrates a phase diagram for ternary mixtures of three nematic liquid crystal materials with orderly composition variations about the quasi eutectic point determined from FIG. 2.

To determine if the minimum melting point composition for a true ternary mixture differs from that found, orderly variations in composition are made about the minimum melting point (−60° C.) determined above. Ten percent variations of each compound were made and the results are illustrated in FIG. 3. The temperature given by the various data points are the freezing point and the nematic-to-isotropic transition point, respectively. For these three nematic materials, the minimum freezing point composition did occur on the line a freezing point of +20° C. and an isotropic transition temperature of +50° C. More detailed information can be found in German Offenlegunsschrift No. 2,139,628, the teachings of which are hereby incorporated by reference.

Other suitable examples of nematic liquid crystal esters include:

p-methoxybenzoic acid-p-hexyloxyphenyl ester
p-butoxybenzoic acid-p-hexyloxyphenyl ester
p-pentyloxy-[p'-n-butoxyphenyl] benzoate.

A still further class of liquid crystals suitable for the second compound is the class of biphenyls represented by the structural formula,

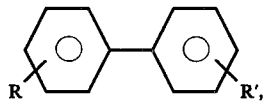

wherein R and R' are the same as described above. Biphenyls can be synthesized by appropriate transformations of a substituted biphenyl starting material. Typically, biphenyl liquid crystals have good chemical resistance and are colorless, but have a narrow nematic temperature range. A typical nematic temperature range for the biphenyl class is illustrated by the compound p-pentyloxy-p'-cyanobiphenyl which has a freezing point of +48° C. and an isotropic transition of 67.5° C. Other suitable biphenyls include:

n-butanoic acid-[p-hydroxy-p'-cyanobiphenyl] ester
p-n-heptyl-p'-cyanobiphenyl
p-n-hexyloxy-p'-cyanobiphenyl.

It is not entirely understood why mixing liquid crystal compounds from different classes results in compositions having unexpectedly wider nematic temperature ranges. Experimental data available indicates that a second order phase transition is involved. That is, the first order phase transition typically associated with nematic-crystal transition is suppressed and a second order glass transition is observed at low temperatures. Thus, these materials do not form eutectics but rather solidify in a manner characteristic of solid solutions. This behavior may be due to the different central groups on the different compounds which may prevent the type of molecular arrangement and orderly packing usually associated with crystallization. Because of the first order phase transition suppression, the term "freezing point" is used herein to mean that temperature at which the second order phase transition occurs.

The second non-Schiff's base liquid crystal compound or compounds is present in an amount of from about 25 to about 65%, by weight. Preferred mixtures contain from about 31 to about 45%, by weight.

In addition to the Schiff's base and second liquid crystal compound, the mixtures of this invention also contain a triphenyl compound which raises the isotropic transition temperature of the composition. Suitable compounds have been found that can be represented by the structural formula

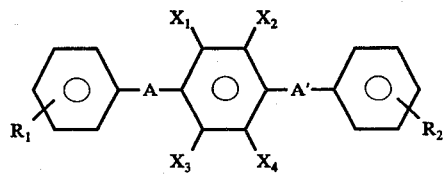

wherein:
A and A' are individually selected from —CH=N— and

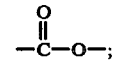

$R_1$ and $R_2$ are individually selected from $C_1$-$C_8$ alkyl, $C_1$-$C_8$ alkoxy, $C_1$-$C_8$ alkyl ester, nitrile, chlorine and bromine; and, $X_1$, $X_2$, $X_3$ and $X_4$ are individually selected from hydrogen, nitrile, chlorine, bromine and at least two of $X_1$, $X_2$, $X_3$ and $X_4$ are hydrogen.

Some specific compounds which have been found to raise the isotropic transition temperature of liquid crystal compositions include:

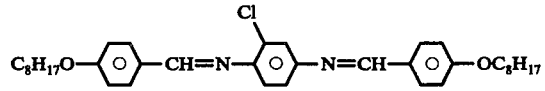

bis(4'-n-octyloxybenzal)-2-chloro-1,4-phenylenediamine

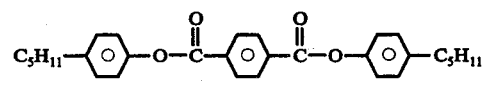

bis(p-pentylphenyl)terephthalate

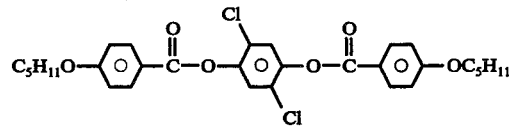

4-pentyloxy-2',5'-dichloro-4'(4''-pentyloxyphenylcarbonyloxy) phenyl benzoate

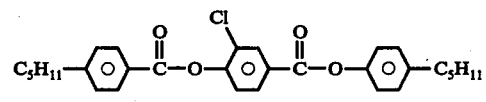

4-(4'-pentylphenylcarbonyloxy)-3-chloro-4''-pentylphenyl benzoate

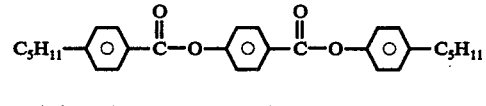

4-pentylphenylcarbonyloxy-4''-pentylphenylbenzoate

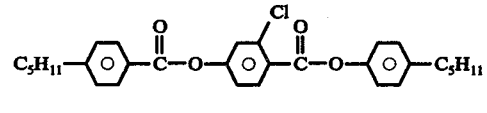

for a constant EBBA/OBCPD concentration; in other words, the orderly variations in EBBA/OBCPD concentrations did not result in compositions having even lower freezing points. Thus, the minimum freezing point composition is 40% Licristal 5, 48% EBBA and 12% OBCPD.

Figure 4:
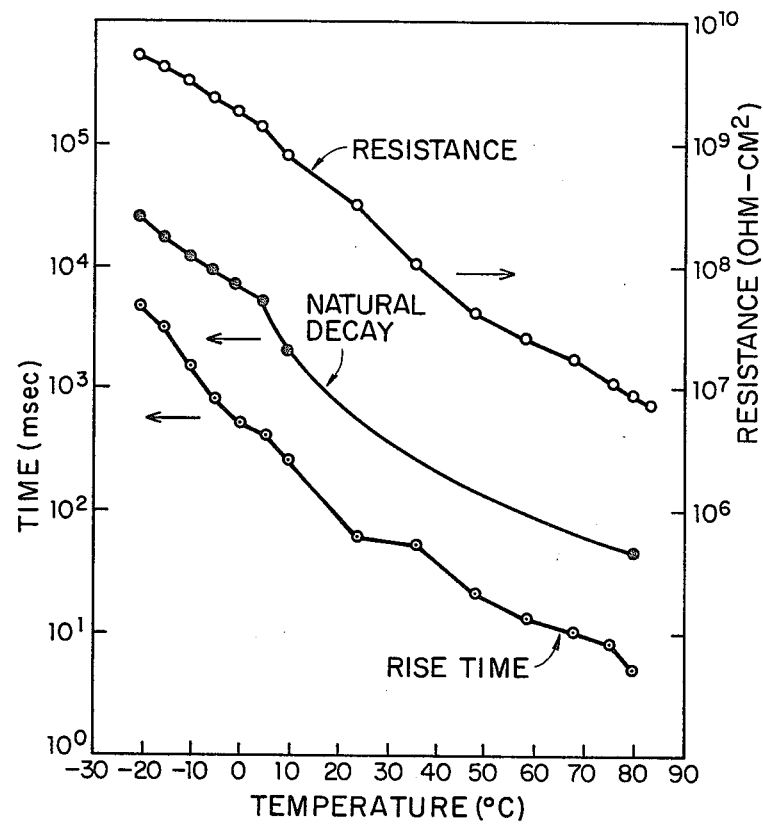
FIG. 4 is a plot of certain measurements which illustrate the electrical properties of the composition located in FIG. 3.

FIG. 4 is a plot of data illustrating the electrical response of the minimum melting point composition determined in FIG. 3. A sample having a surface area of one square cm. and a thickness of 13 microns was used. Rise time was measured with a 50 volt pulse with the time being measured from application of the voltage until maximum scattering was achieved. Natural decay was measured from the time the voltage was removed until zero scattering was achieved.

FIG. 5 illustrates data obtained on the minimum freezing point composition of this Example indicating that the first order nematic-crystal transition is suppressed and that a second order transition occurs. The data were obtained using differential scanning calorimetry, with the term ΔH being related to changes in enthalpy. As can be seen, the large peak representing the nematic-to-isotropic transition point is characteristic of a first order transition whereas the change in baseline at the freezing point is characteristic of a second order transition.

EXAMPLE 2

This Example illustrates a mixture wherein the minimum melting point of the ternary mixture occurs at a range of points, rather than on a minimum melting point line. The nematic materials mixed are EBBA, Licristal 5 and p-butoxybenzylidene-p-n-butylaniline (EBBA). The minimum melting point for binary mixtures of EBBA and BBBA, both Schiff's base compounds, is first determined and occurs at 55% EBBA and 45% BBBA by weight; the freezing point is +2° C. and the isotropic transition point is +72° C. Binary mixtures of Licristal 5 and 55% EBBA/45% BBBA results in compositions having minimum melting points in the range of approximately 60–90% Licristal 5. Further variations of the EBBA/BBBA ratio indicate that wide variations can be made without sacrificing the minimum melting points, as illustrated in FIG. 6.

Subsequently, the minimum melting point composition is determined for a quasi binary mixture of Licristal 5 (an azoxy) added to the 55% EBBA/45% BBBA mixture. A composition of 70% Licristal 5/16% EBBA/14% BBBA has a freezing point of −58° C. and an isotropic transition temperature of +68° C.

OBCPD is added to this minimum freezing point composition to raise the isotropic transition temperature. A composition of 64% Licristal 5/15% EBBA/13% BBBA/8% OBCPD has a freezing point of −60° C. and an isotropic transition temperature of 84° C.

EXAMPLES 3–11

The following nematic temperature ranges were found for the compositions given following the procedure of the preceding Examples:

| EX. | MATERIAL | NEMATIC TEMP. RANGE (±2° C) |
|---|---|---|
| 3 | Licristal 5 (63%) : Kodak 14080[1] (27%): OBCPD (10%) | −40/82 |
| 4 | Licristal 9[2] (30%) : EBBA (56%): OBCPD (14%) | −50/80 |
| 5 | Licristal 5 (42%) : BBBA (46%): OBCPD (12%) | −58/80 |
| 6 | BBBA (40%): OBCPD (20%): Licristal 9 (40%) | −36/82 |
| 7 | Licristal 5 (30%): Licristal 9 (55%): OBCPD (15%) | −42/83 |
| 8 | Kodak 11880[3] (60%): Licristal 9 (40%) | −27/79.3 |
| 9 | Licristal 5 (35%): EBBA (32%): BBBA (20%) OBCPD (10%) | −52/83 |
| 10 | MBBA (32%): BBBA (18%): Licristal 5 (50%) | −54/67 |
| 11 | Licristal 5 (40%): Licristal 9 (60%) | −40/65 |

[1]believed to be a mixture of nematic esters and Schiff's bases
[2]mixture of nematic esters
[3]mixture of nematic Schiff's bases

EXAMPLE 12

FIG. 7 is a plot of data obtained by adding varying amounts of Licristal 5 to a mixture of 65% MBBA/35% BBBA. The resulting ternary mixture has an extended mesomorphic temperature range at amounts of Licristal 5 (an azoxy) from about 10 to about 90%. MBBA is p-methoxybenzylidene-p'-n-butylaniline.

EXAMPLE 13

Following the procedure of Example 1, a minimum freezing point binary mixture of Licristal 5 and BBBA is determined. This composition is found to be 48% Licristal 5/52% BBBA and to have a freezing point of −58° C. and an isotropic transition temperature of 71° C. OBCPD is added to this mixture and a composition of 42% Licristal 5/46% BBBA/12% OBCPD has a freezing point of −58° C. and an isotropic transition temperature of 80° C.

EXAMPLE 14

Following the procedure of Example 1, a minimum freezing point binary mixture of Licristal 9 (a mixture of nematic esters) and EBBA is determined. This composition is 35% Licristal 9/65% EBBA, has a freezing point of −50° C. and an isotropic transition temperature of 69° C. OBCPD is added to the mixture and a composition of 30% Licristal 9/56% EBBA/14% OBCPD has a freezing point of −50° C. and an isotropic transition temperature of 82° C.

EXAMPLE 15

A number of nematic liquid crystal mixtures were prepared to demonstrate the deleterious effect on the freezing points with increasing amounts of OBCPD. The freezing points were measured by freezing the compositions in liquid nitrogen and subsequently warming the compositions until a melting point was determined. Because these operations were done so rapidly that equilibrium conditions were not reached, and because the compositions had been exposed to the atmosphere for several days prior to testing, the freezing points detected are probably not very precise and are, in fact, believed to be on the high side. Also, previously obtained data seemed to indicate that freezing points measured in this fashion were consistently significantly higher than when they were measured on a differential scanning calorimeter. Nevertheless, these values are a relative indication of the effect of varying concentrations of OBCPD. The data are summarized as follows:

| Mixture | PERCENT BY WEIGHT | | | | | Freezing Point (° C) |
|---|---|---|---|---|---|---|
| | Licristal 5 | Licristal 9 | BBBA | EBBA | OBCPD | |
| (a) | 42 | | 46 | | 12 | −44 |
| (b) | 40.5 | | 44.5 | | 15 | −43 |
| (c) | 34.5 | | 38.5 | | 27 | −38 |
| (d) | 28 | | 32 | | 40 | −32 |
| (e) | 48 | | 42 | | 10 | −45 |
| (f) | 48 | | 44 | | 8 | −47 |
| (g) | | 30 | | 56 | 14 | −37 |
| (h) | | 24.5 | | 50.5 | 25 | −32 |
| (i) | | 18 | | 70 | 12 | −35 |

What is claimed is:

1. A liquid crystal composition having a freezing point of at most about −50° C and an isotropic transition point of at least about 80° C which, based upon 100% by weight, consists essentially of:

a. from about 10% to about 14% by weight of bis(4'-n-octyloxybenzal)-2-chloro-1,4-phenylenediamine;

b. from about 40% to about 60% by weight of a Schiff's base nematic liquid crystal compound selected from the group consisting of p-ethoxybenzylidene-p'-n-butylaniline and p-butoxybenzylidene-p'-n-butylaniline; and, c. from about 35 to about 50% by weight of a mixture of nematic liquid crystal azoxy compounds represented by the structural formula

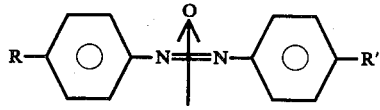

wherein one of R and R' is $C_1$-$C_8$ alkyl and the other of R and R' is $C_1$-$C_8$ alkoxy.

* * * * *